United States Patent [19]

Neely, Jr.

[11] 4,008,818
[45] Feb. 22, 1977

[54] HAYSTACKING AND RELOADING TAILGATE APPARATUS

[76] Inventor: Allan B. Neely, Jr., 12991 E. Nevada, Aurora, Colo. 80012

[22] Filed: Apr. 11, 1975

[21] Appl. No.: 567,139

Related U.S. Application Data

[63] Continuation-in-part of Ser. No. 275,479, July 7, 1972.

[52] U.S. Cl. .............................. 214/505; 214/509; 214/522; 214/82
[51] Int. Cl.² ..................................... B60P 1/28
[58] Field of Search .......... 214/501, 505, 506, 508, 214/509, 512, 750, 6 B, 83.3, 82, 522; 198/219

[56] References Cited

UNITED STATES PATENTS

| | | | |
|---|---|---|---|
| 2,578,802 | 12/1951 | Heidrick et al. | 214/512 |
| 2,877,916 | 3/1959 | Repke et al. | 214/750 |
| 3,103,368 | 9/1963 | Erickson | 214/515 X |
| 3,106,523 | 10/1963 | Couture | 198/219 X |
| 3,534,875 | 10/1970 | Hallstrom, Jr. | 214/83.3 |
| 3,892,337 | 7/1975 | Neumann | 198/219 X |

*Primary Examiner*—Albert J. Makay
*Attorney, Agent, or Firm*—Van Valkenburgh and Lowe

[57] ABSTRACT

A fork-like array of arms is located at an end of a haystack wagon which will function to hold, to pick up or to release a haystack onto or from a haystack wagon. The arms may be rigidly held in place, or may swing to various positions depending upon the type of haystack being handled. In the present invention, the arms are arranged to reciprocate in alternate sequences with respect to each other, whereby some of the arms will be at rest with respect to the haystack, while other of the arms are moving into or out of it. With such reciprocation, a stack of hay bales may be easily picked up or discharged onto and from a bale wagon or a haystack may be easily picked up and moved onto a hay wagon.

7 Claims, 14 Drawing Figures

U.S. Patent  Feb. 22, 1977  Sheet 1 of 3  4,008,818
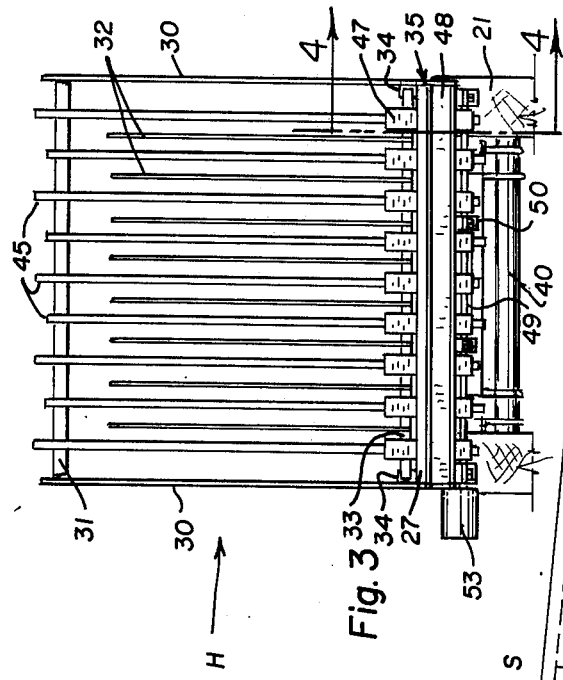
Fig. 3
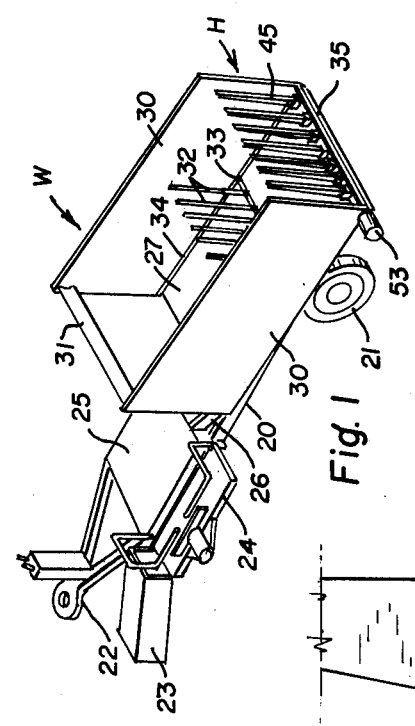
Fig. 1
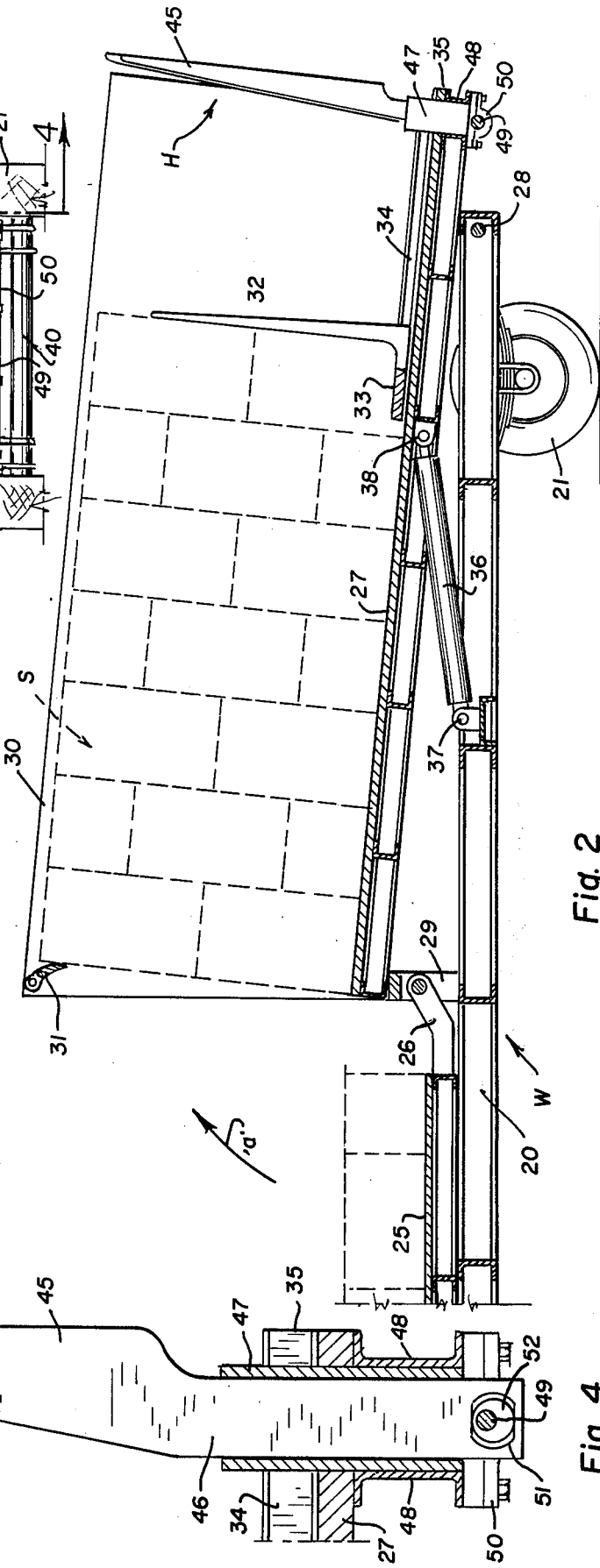
Fig. 2
Fig. 4

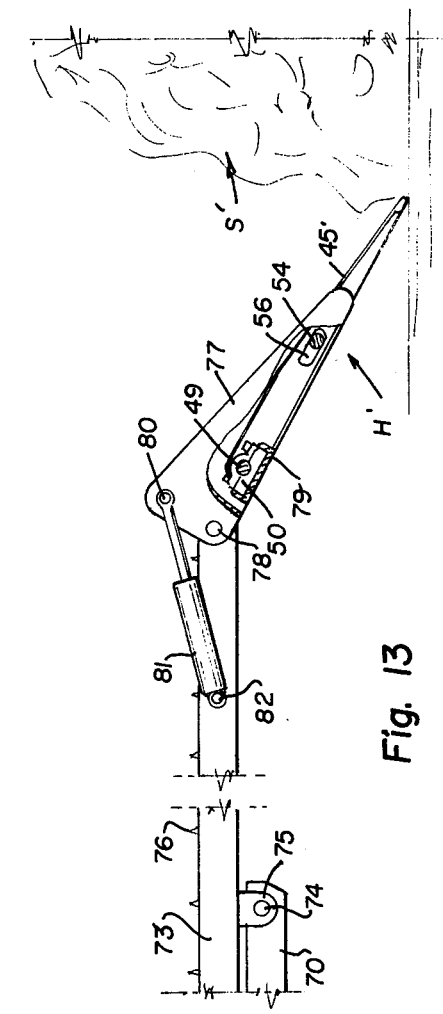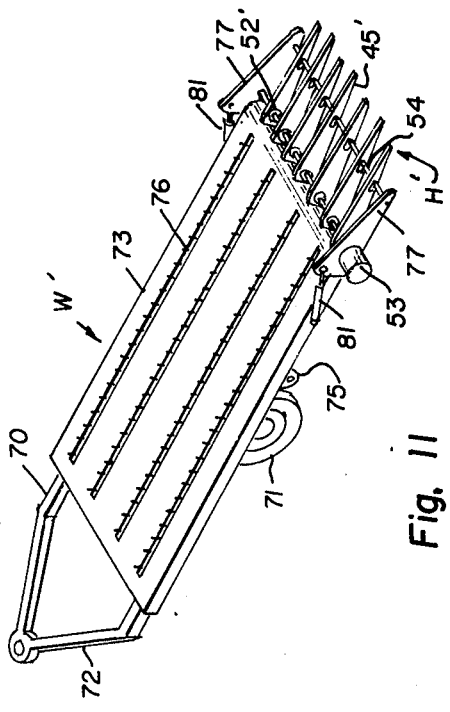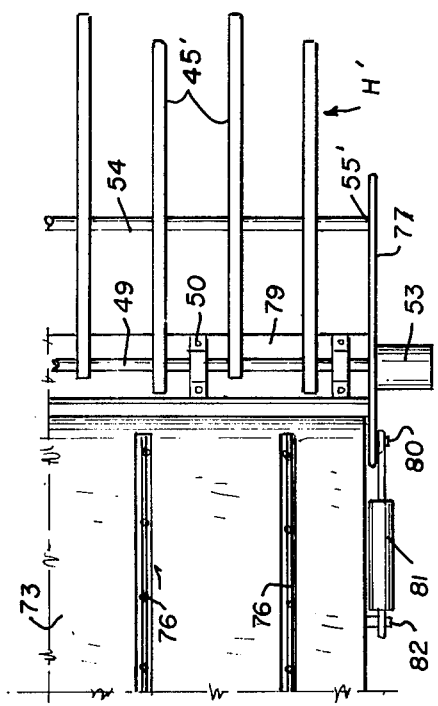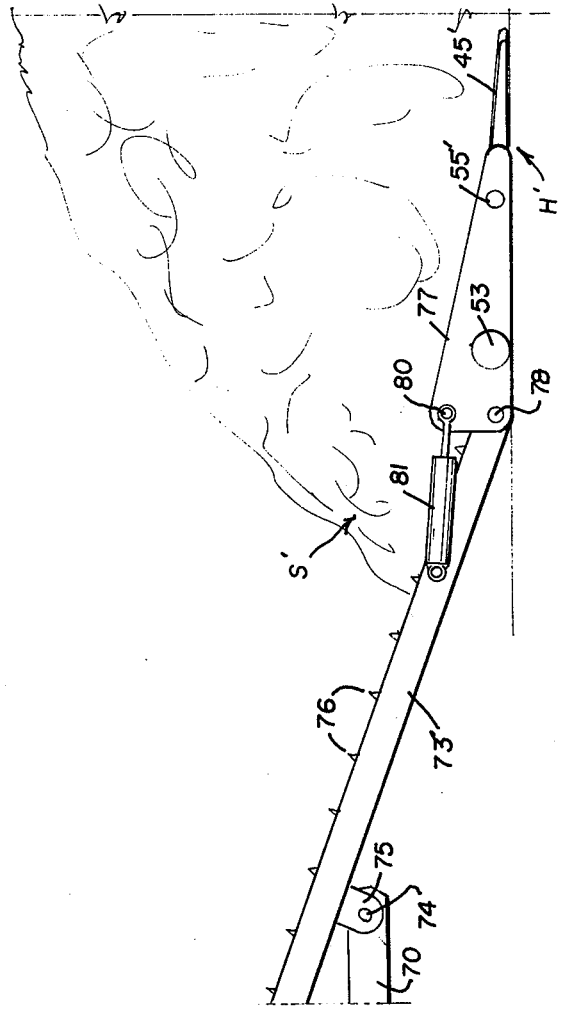

HAYSTACKING AND RELOADING TAILGATE APPARATUS

This invention is a continuation-in-part of my application filed July 7, 1972, Ser. No. 275,479, entitled BALED HAY STACK FORMING APPARATUS, to disclose subject matter disclosed but not claimed in that application, and also other related subject matter.

This invention relates to tailgate apparatus for the loading and unloading of haystacks onto or from hay wagons, and more particularly to improvements in apparatus which will hold a haystack when it is being picked up for loading onto a wagon or when it is being discharged from a wagon.

Accordingly, the invention will be called a "haystacking and reloading tailgate apparatus", and sometimes simply, a "tailgate apparatus". It is to be noted that the tailgate apparatus finds utility in handling two different types of haystacks. The first type is a hay bale haystack, where bales of hay are formed as regular layers and the layers are piled upon each other to form a rectangular prism. A second type is a loose-hay haystack. Wagons have been developed for carrying both types of haystacks, and a wagon for carrying hay-bale haystacks is different in construction from a wagon developed for carrying a loose-hay haystack. Accordingly, the invention will, by necessity, be described with respect to both types of wagons.

The invention, the haystack tailgate apparatus, comprises, in essence, a set of arms in a fork-like array at the loading and discharge end of a hay wagon, hereinafter simply called "the end" of the wagon. These arms are either affixed or swingable, as the need may be, to most effectively reach underneath a haystack to lift it. In reaching under the haystack, the arms will reciprocate in alternate patterns with respect to each other to better move under the haystack when loading the same onto the wagon or to better move away from the haystack when it is being discharged from the wagon.

It follows that an object of the invention is to provide a novel and improved haystack tailgate apparatus at the end of a hay bale wagon which can either load or discharge a haystack onto or from the wagon.

Another object of the invention is to provide a novel and improved haystack tailgate apparatus capable of discharging a comparatively tall hay-bale, haystack from a tipping type of wagon in a quick, effective and easy manner and with a minimum chance of toppling the haystack as the wagon moves away from the stack.

Another object of the invention is to provide a novel and improved haystack tailgate apparatus at the discharge end of a tipping type of wagon which can easily move under a hay-bale haystack to pick it up and place it in the wagon.

Another object of the invention is to provide a novel and improved haystack tailgate apparatus at the end of a loose-hay haystack wagon which can move underneath a stack of loose hay to facilitate picking up the haystack and also, to facilitate unloading the wagon.

Yet other objects of the invention are to provide in a novel and improved haystack tailgate apparatus for unloading and loading haystacks, an arrangement of components which is simple, economical, reliable, rugged and durable.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1 is a somewhat diagrammatic, isometric view of a conventional hay bale haystack wagon having the improved haystack tailgate apparatus at the rear of the wagon.

FIG. 2 is a longitudinal, sectional view of the rear portion of the wagon shown at FIG. 1 to illustrate the stack retaining compartment of the wagon, a partially formed stack of hay bales therein shown in broken lines, and the holding apparatus at the end of the wagon.

FIG. 3 is a rear elevational view of the wagon to better illustrate the spacing arrangement of the arms of the holding apparatus.

FIG. 4 is a fragmentary sectional detail as taken from the indicated line 4—4 at FIG. 1, but on an enlarged scale.

FIG. 11 is a somewhat diagrammatic isometric view of a conventional stack moving wagon for a loose-hay haystack with the improved tailgate apparatus at the end of the wagon.

FIG. 12 is a plan view of a fragment of the wagon and the tailgate apparatus shown at FIG. 11.

FIG. 13 is a fragmentary side elevational view depicting the manner in which the tailgate apparatus is positioned to commence picking up a hay bale and with portions broken away to show parts otherwise hidden from view.

FIG. 14 shows a further positioning of the wagon and the tailgate apparatus as the haystack is being picked up.

Figure 5:
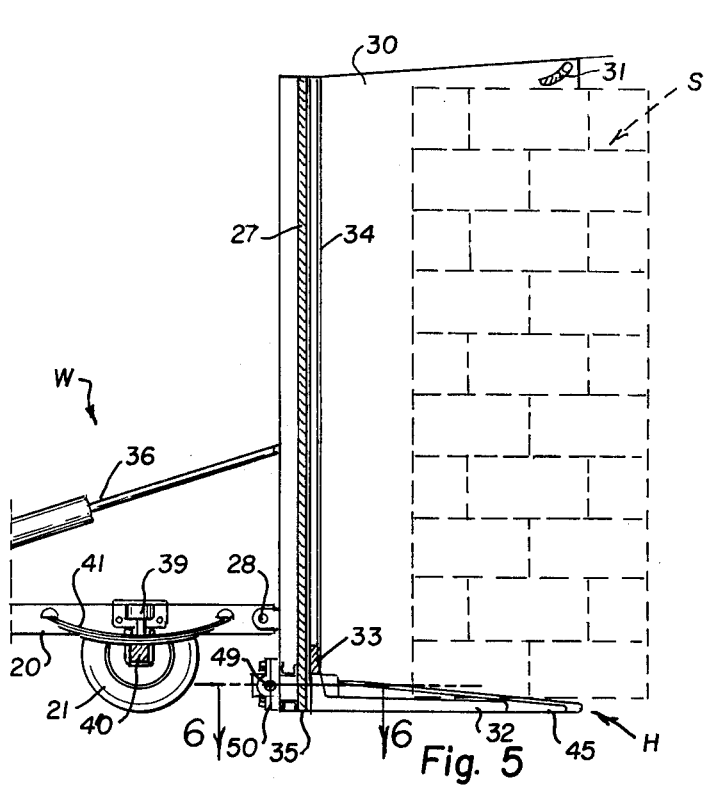
FIG. 5 is a longitudinal sectional view similar to FIG. 2, but on a reduced scale and showing the stack retaining compartment tipped upwardly and a complete stack therein in broken lines being discharged therefrom by the tailgate apparatus.

Referring first to the embodiment illustrated at FIGS. 1-6, a typical hay-bale haystack wagon is illustrated at FIG. 1. This wagon W is patterned after the structure disclosed in the patent to G. E. Gray, U.S. Pat. No. 2,848,127. The wagon W is formed as a longitudinally extended body frame 20 mounted upon wheels 21 and a trailer hitch 22 is provided at the front of the body 20 for towing the unit by a tractor. The wagon may also be a power driven unit.

The wagon W will contain a hay bale pickup apparatus 23 through which hay bales move as they are encountered in a field, and the pickup apparatus moves the bales to a bale-layer forming chamber 24, rearwardly of the pickup. This chamber 24 will shift bales onto a horizontally disposed transfer bed 25 to make up a bale stack layer of various patterns. Such an operation is disclosed in my U.S. Pat. No. 3,596,777 issued Aug. 3, 1971.

The transfer bed is mounted upon hinges 26 at its rear edge. Thus, whenever a bale layer is completed upon the transfer bed 25, the bed 25 swings upwardly and rearwardly by a mechanism not shown, and from a horizontal to a vertical position, as in the direction of the indicated arrow *a* at FIG. 2. This movement deposits the layer upon a stack-holding deck 27. The deck 27 is mounted upon the body frame 20 by a pivot 28 at the rear end of the body and the front end of the deck 27 is mounted upon a prop 29 upstanding from the body 20. Thus, when lying upon the body frame 20, the deck tips rearwardly at a small angle to facilitate holding a stack S formed upon it in place. Also, sidewalls 30 may be provided at each side of the deck and a transverse detent type of a catch 31 is provided across the top front end of the walls to prevent the foremost stack layer from falling forwardly.

A hay bale stack S is formed upon this deck 27 by adding hay bale layers from the swinging transfer bed 25. The layers move rearwardly on the deck 27 and as they are added, shiftable tines 32 move with the stack to hold the rearward layer in place. This layer will become the bottom layer of a completed upright stack. The tines are suitably spaced apart and are secured to a crossplate 33 which rides in guideways 34 at the sides of the bed as indicated at FIG. 2. They are held against the lowermost bale layer by a spring mechanism not shown. The tines are also rearwardly positioned with respect to the crossplate 33, as best illustrated at FIG. 2 so that they may move between fingers of the hay bale tailgate apparatus and out of the way when the stack is completed, as hereinafter further described.

A hay bale stack S is formed when the stack-holding deck 27 is filled with hay bale layers. This deck may then be tipped about the pivot 28 to an upright position, and the rear end 35 of the stack holding deck 27 projects beyond the rear end of the body 20 a distance sufficient to place the rear end 35 of the deck upon the ground whenever the deck is tipped to an upright position. The tipping action is by a cylinder 36 mounted upon the body 20 as at bearing 37, FIG. 2, and the piston of this cylinder is connected to the underside of the deck 27 as a bearing 38. A suitable hydraulic system and controls are provided for operating this cylinder 36 and also for operating the hydraulic components, hereinafter described. Such is not shown, however, since hydraulic systems and their controls are essentially conventional.

To make sure that the rear end 35 of the deck 27 rests upon the ground at a proper elevation when it is tipped upright, regardless of the load being carried, a jack cylinder 39 is mounted at each side of the frame 20 and over the rear wheel axle 40 to bear against this axle as shown at FIG. 5. The wheel axle is supported below the frame members 20 in a conventional manner as by springs 41 and thus, it is possible to raise or lower the truck body 20 with respect to the wheels, and ground, to any desired distance by extending the two jack cylinders 39. They can also level up the frame 20, and hold the deck 27 vertical when raised, even when the vehicle is upon uneven ground.

The haystack tailgate apparatus H consists of a transverse array of arms 45 at the rear end of the stack holding deck. These arms upstand from the deck and are spaced apart at a spacing such that the tines 32 may move between them when the stack S is completed and the rearmost stack layer has moved to the rear end of the deck, as best shown at FIG. 5. The arms 45 are made of rigid material and are comparatively heavy, with strength sufficient to support the entire hay bale stack S whenever the deck 27 is tipped upright.

Thus, the connection of the arms 45 to the deck is sufficiently rugged and heavy to withstand the strain imposed by a heavy haystack being supported upon the cantilevered arms. In the present invention, these arms reciprocate, one moving forward a short distance while an adjacent arm moves rearwardly to facilitate moving the pickup apparatus under, or out from under, a haystack. Accordingly, each arm 45, while being tapered at the haystack supporting section, is formed with a parallel, smooth base 46 which slidably fits in a sleeve 47 mounted at the rear end of the deck. Suitable structural crossmembers 48 of this deck are provided at each side of these sleeves to hold them in place.

Reciprocation of each arm is effected by a drive shaft 49 which is mounted upon bearings 50 carried by the structural members 48, and with the shaft extending through slotted openings 51 at the lower end of the base, as in the manner best illustrated at FIG. 4. An eccentric 52 is mounted on the shaft in each slot and thus, rotation of the shaft causes each arm 45 to move longitudinally in the sleeve 47. Rotation may be effected by a hydraulic motor 53 attached to the shaft 49, as at the side of the deck 27, as illustrated at FIG. 1. Suitable slidable bearing surfaces are provided between each sleeve 47 and base of the arm within it, and also, at the eccentric, to minimize frictional wear.

Figure 6:
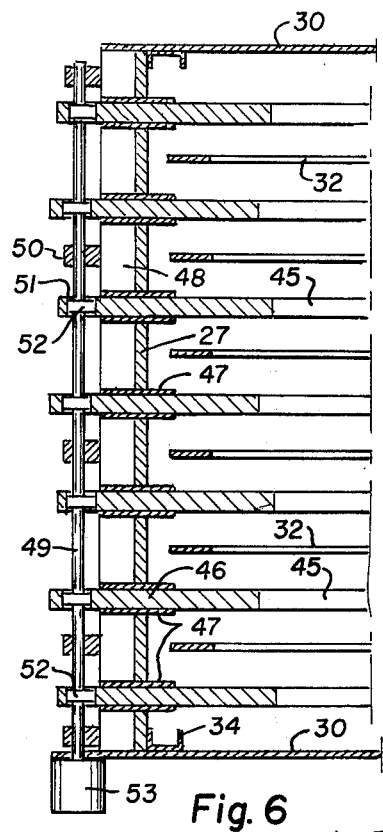
FIG. 6 is a fragmentary sectional detail as taken from the indicated line 6—6 at FIG. 5, but on an enlarged scale.

As best shown at FIG. 6, the eccentrics of adjacent arms 45 are oriented oppositely on the shaft, that is, 180° apart so that when one arm is moving forwardly, the adjacent arms are retracting. However, this pattern may vary and the adjacent eccentrics may be 120 degrees or 90 degrees apart, if desired.

The operation of this invention may now be described further with respect to loading and unloading a haystack onto or from the deck 27. When the deck is filled with hay bale layers, with the lowermost bale layer being against the arms 45 and the fingers 32 between these arms, the deck may be swung to an upright position as shown at FIG. 5, the jack cylinders 39 being used to level the vehicle body 20 and place the end of the deck at the ground. Next, the motor 53 commences to rotate the shaft 49 and reciprocate the arms 45. The vehicle may then slowly move forwardly, away from the stack and the arms will then easily slide out from under the stack without any trouble. Whenever a stack is to be loaded onto the vehicle deck, the reverse procedure is used. The deck is raised to the upright position, the motor 53 starts the arms reciprocating and the vehicle moves into the stack with the arms easily sliding under the stack. The deck is then lowered onto the vehicle to transport the load to another location.

Figure 7:
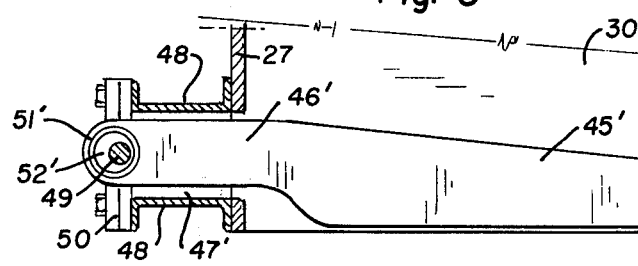
FIG. 7 is a fragmentary sectional detail similar to FIG. 4, but illustrating a modified construction of the arms of the haystack tailgate apparatus.
Figure 8:
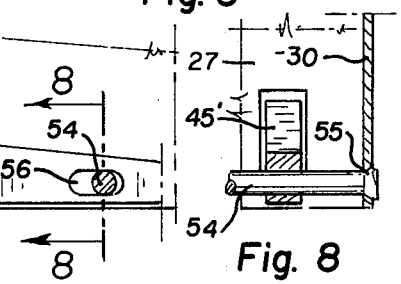
FIG. 8 is a fragmentary sectional detail as taken from the indicated line 8—8 at FIG. 7

FIGS. 7 and 8 illustrate a modified arrangement for holding and reciprocating the arms 45'. In this arrangement, the sleeves 47 are eliminated and the base 46' of each arm 45' is within an enlarged socket 47' formed between structural members 48. A circular opening 51' receives an eccentric bearing 52' mounted upon the shaft 49. With this arrangement, the arms 45' not only reciprocate longitudinally, but also, move in a circular manner adjacent to the shaft 49. The extended ends of the arms 45' must be supported with this arrangement and a bar 54 extends transversely across the rear of the compartment formed by the deck 27 and sidewalls 30, the bar 54 being attached to, and being supported by, the sidewalls 30 as at 55, as best shown at FIG. 8. Each arm 45' includes a slot 56 near its extended end wherethrough the bar 54 is passed to hold the arm, the slot 56 permitting longitudinal reciprocative movements of the arms 45' at these extended ends.

Figure 9:
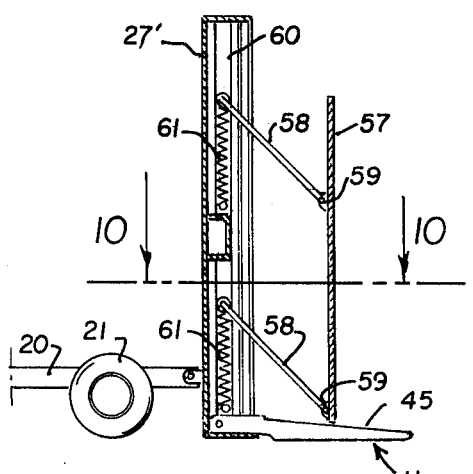
FIG. 9 is a small size longitudinal sectional view of the rear portion of a truck, similar to FIG. 5, but showing an arrangement where a false floor of the retaining compartment shifts outwardly to facilitate holding a hay bale haystack upright.
Figure 10:
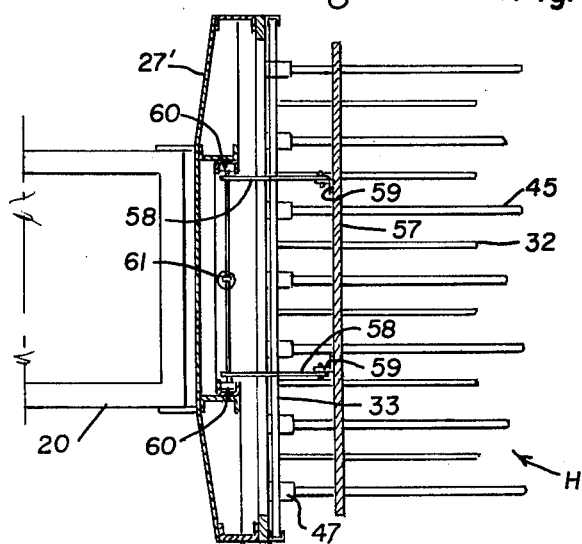
FIG. 10 is a fragmentary sectional detail as taken from the indicated line 10—10 at FIG. 9, but on an enlarged scale.

FIGS. 9 and 10 illustrate a modified arrangement where the stack holding deck 27' has a false floor 57 which extends outwardly whenever the deck is tipped to an upright position and a stack is being discharged from the arms. This false floor 57 is suitably held by a parallelogram arrangement of slide struts 58 having their lower ends pivotally connected to the underside of the floor, as at bearings 59, and their upper ends held in suitable guideways 60 in the deck structure 27'. A tension spring 61 is connected to the struts to pull their upper ends downwardly and urge the false floor 57 outwardly whenever the deck 27' is tipped to a vertical position. Thus, the false floor 57 will bear against a haystack while it is being loaded and unloaded to better stabilize the stack.

FIGS. 11 through 14 illustrate the use of the invention with a wagon for holding a stack of loose hay. The wagon W' may be of a type such as that disclosed in the patent to B. A. Schlitz, U.S. Pat. No. 3,209,932. This wagon W' is formed as a frame 70 mounted upon wheels 71 and a trailer hitch 72 is provided at the front of the body 70 so that it may be towed by a tractor. The wagon may also be a self-contained, power driven unit.

A haystack deck 73 is mounted upon this wagon body 70 at a pivot 74 at the rear end of the body which connects with a bearing 75 at the underside of the deck at an intermediate location so that the rear end of the deck may tip downwardly to the ground, as illustrated at FIG. 14. Suitable cylinders or other actuating devices, not shown, are provided for tipping and also holding this deck in position.

Longitudinal arrays of spike chains 76 are provided at the surface of the deck which are moved longitudinally by a suitable drive, underneath the deck, not shown, to assist in shifting a haystack forwardly and rearwardly onto and off from the deck.

The haystack tailgate apparatus H', in contrast to that heretofore disclosed, must be pivotally mounted on the end of the haystack deck 73 so that it can be swung to various positions as best illustrated at FIGS. 13 and 14. Accordingly, the tailgate apparatus H' is carried between a pair of triangular swing plates 77 which are mounted on a transverse pivot 78 at each side of the end of the deck. A crossbeam 79 extends between these plates to interconnect them and to carry bearings 50' of the shaft 49 as hereinafter further described. One corner of each swing plate extends upwardly and is provided with a pivot 80 to connect with the piston of a hydraulic cylinder 81 whose base is connected with a pivot 82 on the side of the deck 73. The pistons of cylinders 81, at each side of the deck, extend and retract in unison to swing the haystack tailgate apparatus to any selected position with respect to the deck 73, such as the positions illustrated at FIGS. 13 and 14.

The tailgate apparatus H' is illustrated as a structure essentially the same as that described at FIGS. 7 and 8. The bearings 50' are mounted upon the crossbeam 79 to hold the shaft 49, with a motor 53 at the outward side of a swing plate 77 connecting with this shaft as shown at FIG. 12. The arms 45' of the pickup are thus reciprocated by eccentrics 52' on the shaft 49 fitting in circular openings 51' at the bases of the arms. The extended ends of the arms are held in position by a transverse bar 54 fitted into slots 56 in the arms, with the ends of the bar 54 being connected to the extended ends of the swing plates 71 as at 55'.

In picking up a loose hay haystack, the tips of the arms 45' will be pushed under the edge of a haystack S', as illustrated at FIGS. 13 and 14. The rear end of the deck 73 tips downwardly to the ground and then the tailgate apparatus lies flatly against the ground and continues to move under the haystack. The reciprocation of the arms 45' with respect to each other causes this movement under the haystack to be easy and with comparatively little pushing force being required by the wagon. Once the haystack moves from the tailgate apparatus to the deck of the wagon, it can then move onto the wagon deck by action of the spike chains 76 at the deck 73. Once loaded, the deck will tip to a level position upon the trailer body for transportation to a desired location. Unloading a haystack is the opposite to the loading operation. The deck tips rearwardly to place its rear edge, and the tailgate apparatus H', upon the ground. The spike chains 76 on the deck commence a rearward discharging movement and at the same time, the arms 45' are reciprocated. Thus, as the haystack moves rearwardly, the trailer will move forwardly and out from under the haystack without requiring a large pulling force to do so.

With a tailgate apparatus H', the base end of each arm 45' will not only reciprocate longitudinally, but will also move up and down to follow the path of movement generated by the eccentric 52' on the shaft 49 as heretofore explained. It is to be noted that the direction of rotation of the shaft can be advantageously reversed when loading and unloading operations are underway. This is because the base 46' and arm 45' will raise upwardly when moving either outwardly, or inwardly as the eccentric 52 rotates, and outwardly or inwardly movements depend upon the direction of rotation of the shaft 49. For example, referring to FIG. 7, a clockwise rotation of the shaft will facilitate unloading operations and a counterclockwise rotation of the shaft will facilitate loading operations.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. A haystack loading and unloading apparatus adapted to be mounted at the end of a hay wagon or the like, to load and unload an upstanding stack of hay bales thereon and therefrom, and comprising, in combination therewith:
   a. a transverse, horizontally disposed array of longitudinally extended arms in spaced parallelism and cantilevered from the hay wagon to support the stack of hay bales;
   b. means to support the arms with the stack of hay bales thereon including a transverse array of longitudinally axised sleeves carried on the wagon with the base portion of each arm being slidably fitted into a sleeve and with the arm being cantilevered therefrom; and c. means at the base of the arms to longitudinally reciprocate the arms within the sleeves, with adjacent arms reciprocating in different directions, whereby to facilitate moving the arms under or from a haystack.

2. In the apparatus defined in claim 1, wherein the means to longitudinally reciprocate the arms includes:

a transverse shaft at the base of the arms;

eccentric means on the shaft with an eccentric means connecting with each arm; and means to rotate the shaft.

3. The apparatus defined in claim 1 wherein the means to longitudinally reciprocate the arms includes:

a transverse shaft at the base of said arms;

an opening in each arm at a base portion extended through the supporting sleeve through which the shaft extends;

an eccentric means on the shaft at each opening;

a means to rotate the shaft; and a slack means associated with each opening to limit the movement of the arm by the eccentric to the sliding movement in the sleeve.

4. In the apparatus defined in claim 2, wherein the hay wagon is adapted for the loading and unloading of a hay bale haystack, including:

a deck pivotally mounted upon the end of the wagon and adapted to assume a substantially horizontal position for holding a hay bale haystack on its side and to tip to a vertical position for discharging or picking up a hay bale haystack;

wherein said means to support the arms is adapted to hold the arms in a substantially vertical position with respect to the deck to support a haystack therein whenever the deck is tipped to a vertical position.

5. In the apparatus defined in claim 4, wherein:

the deck is pivoted to the rear end of the vehicle at a pivot point which permits the end of the deck to extend beyond the end of the vehicle a distance sufficient to permit the deck to rotate to ground level whenever the deck is tipped to a vertical position.

6. In the apparatus defined in claim 5, wherein:

the rear end portion of the vehicle is supported upon a pair of wheels near the rear end of the vehicle by a spring means permitting the height of the vehicle to vary with respect to the height of the wheels; and a jack cylinder means between the vehicle and the wheel supporting means adapted to vary the height of the vehicle with respect to the wheels whereby to adjustably shift the rear end of the deck with respect to the ground when the deck is tipped to its vertical position.

7. In the apparatus defined in claim 6, wherein:

the rear wheels are mounted upon a common transverse axle; and an independently-operated jack cylinder means is disposed at each side of the frame whereby to adjustably shift each side of the rear end of the deck with respect to the ground when the deck is in a vertical position and whereby to permit the deck to be held in a vertical position when the wheels are on uneven ground.

* * * * *